US00RE45647E

(19) United States
(12) Reissued Patent
Ozaki et al.

(10) Patent Number: US RE45,647 E
(45) Date of Reissued Patent: Aug. 11, 2015

(54) HIGHLY COMPRESSIBLE IRON POWDER

(71) Applicant: JFE Steel Corporation, Tokyo (JP)

(72) Inventors: Yukiko Ozaki, Tokyo (JP); Masateru Ueta, Tokyo (JP); Naomichi Nakamura, Tokyo (JP)

(73) Assignee: JFE Steel Corporation (JP)

(21) Appl. No.: 14/187,559

(22) Filed: Feb. 24, 2014

Related U.S. Patent Documents

Reissue of:
(64) Patent No.: 6,638,335
Issued: Oct. 28, 2003
Appl. No.: 10/123,343
Filed: Apr. 16, 2002

(30) Foreign Application Priority Data

Apr. 20, 2001 (JP) ..... 2001-123449

(51) Int. Cl.
*B22F 1/00* (2006.01)
*C22C 38/00* (2006.01)

(52) U.S. Cl.
CPC ..... *B22F 1/0014* (2013.01); *C22C 38/004* (2013.01)

(58) Field of Classification Search
CPC ..... B22F 1/0014; C22C 38/004
USPC ..... 75/255
See application file for complete search history.

(56) References Cited

U.S. PATENT DOCUMENTS

| | | | | | |
|---|---|---|---|---|---|
| 3,881,912 | A * | 5/1975 | Mikurak | ..... | 75/255 |
| 3,901,661 | A * | 8/1975 | Kondo et al. | ..... | 75/255 |
| 4,971,755 | A * | 11/1990 | Kawano et al. | ..... | 419/10 |
| 5,462,577 | A * | 10/1995 | Ogura et al. | ..... | 75/345 |
| 5,534,045 | A * | 7/1996 | Ogura et al. | ..... | 75/243 |

FOREIGN PATENT DOCUMENTS

| | | |
|---|---|---|
| JP | 61-23701 | 2/1986 |
| JP | 04-173901 | 6/1992 |
| JP | 7-157803 | 6/1995 |

OTHER PUBLICATIONS

Renowned Metal Powder Maker in Sweden, Patent Appeal Court, Case No. 08-159, Reasons for Decision, pp. 29-36 with English Translation (8 pages).
JP404236702A Abstract, Aug. 1992.*
A Catalogue of Commercial Iron Powder Products (Kawasaki Steel Co.), "Reduced Iron Powders Atomized Iron and Steel Powders", pp. 8-11.

* cited by examiner

*Primary Examiner* — Jerry D Johnson
(74) *Attorney, Agent, or Firm* — DLA Piper LLP (US)

(57) ABSTRACT

A highly compressible iron powder for powder metallurgy has an optimized particle size distribution. The Vickers microhardness of the particles that do not pass through the sieve having the nominal opening of 150 μm is controlled to be at most about 110. The iron powder is suitable for production of magnetic parts having high magnetism and mechanical parts having high mechanical strength.

8 Claims, No Drawings

HIGHLY COMPRESSIBLE IRON POWDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

This invention relates to highly compressible iron powder that is suitable for manufacturing electric and mechanical parts that require high magnetism and/or high mechanical strength by powder metallurgy.

2. Description of the Related Art

Powder metallurgy allows production of metallic parts having complicated shapes by near net shape forming and is widely used in production of various parts. Near net shape forming can readily produce target shapes without additional machining.

In powder metallurgy, metal powder such as iron powder having a desired particle size distribution is prepared by controlling the atomizing conditions for molten metal or the reduction conditions for metal oxide as a low material or by classifying powder particles through sieves. The controlled powder is mixed with a lubricant and another metal powder (or other metal powders) for forming an alloy, if necessary. The metal powder or metal powder mixture is compacted in a die and the resulting green compact is sintered or treated with heat to form a part. Alternatively, the metal powder or metal powder mixture is mixed with a binder such as resin and the mixture is compacted in a die.

Such powder metallurgy is employed in production of mechanical parts for use in vehicles and soft magnetic parts such as transformer cores and noise filter cores for eliminating noise in electronic circuits. Higher density is required to maintain high mechanical strength for mechanical parts and high permeability for magnetic parts. High compressibility must be required of iron powder to increase the density of the parts.

For example, Japanese Examined Patent Application Publication No. 8-921 (hereinafter referred to as JP-B2-8-921) discloses an iron powder having the following particle size distribution: On the bases of mass percent of fractions after sieve classification using sieves defined in Japanese Industrial Standard (JIS) Z 8801 (Ed. 1984), the iron powder contains 5% or less of −60/+83-mesh particles that pass through a sieve having a nominal opening of 250 μm and do not pass through a sieve having a nominal opening of 165 μm, 4% and more to 10% or less of −83/+100-mesh particles that pass through a sieve having a nominal opening of 165 μm and do not pass through a sieve having a nominal opening of 150 μm, 10% and more to 25% or less of −100/+140-mesh particles that pass through a sieve having the nominal opening of 150 μm and do not pass through a sieve having a nominal opening of 106 μm and 10% and more to 30% or less particles that pass through a 330-mesh sieve having a nominal opening of 45 μm. Furthermore, the crystal grain size in iron particles of the particle size of −60/+200-mesh that pass through a sieve having the nominal opening of 250 μm and do not pass through a sieve having a nominal opening of 75 μm grows large by the grain size number of 6.0 or less according to a method for measuring a ferrite particle size defined in JIS G 0552 (Ed. 1977).

According to JP-B2-8-921, high-density parts are obtained from such a pure iron powder.

The resulting iron powder is compounded with 0.75% zinc stearate as a powder metallurgy lubricant and the resulting compound is compacted under a compacting pressure of 490 MPa. However, the density of the green compact is 7.08 to 7.12 g/cm$^3$ (7.08 to 7.12 Mg/m$^3$). When this pure iron powder is used in magnetic parts such as magnetic cores, the parts do not have satisfactorily high flux density and permeability. Accordingly, the green density is still insufficient.

Nowadays, iron powder metallurgy parts must have higher strength to reduce the volume and weight of mechanical parts for vehicles. In general powder metallurgy, high-strength parts are produced by a double-press double-sintering method including a first compaction and sintering step and a second compaction and sintering step. Alternatively, the high-strength parts are produced by a sinter forging process including a compaction and sintering step and a hot forging step. Unfortunately, these processes increase production costs.

It would, therefore, be advantageous to provide a highly compressible iron powder suitable for production of magnetic parts having excellent magnetic characteristics and mechanical parts having high mechanical strength.

SUMMARY OF THE INVENTION

We have discovered that a highly compressible iron powder can be obtained by controlling the particle sizes of iron powder and by softening coarse iron particles. We have further discovered that a green density higher than 7.20 Mg/m$^3$ can be attained by using this iron powder in a one-stage compaction process substantially at room temperature and about 490 MPa.

According to a first aspect of the invention, a highly compressible iron powder for powder metallurgy comprises, on the basis of mass percent of fractions after sieve classification using sieves defined in Japanese Industrial Standard (JIS) Z 8801-1:00 Edition 2000), substantially 0% particles that do not pass through a sieve having a nominal opening of 1 mm; more than 0% to about 45% or less particles that pass through a sieve having a nominal opening of 1 mm and do not pass through a sieve having a nominal opening of 250 μm; about 30% and more to about 65% or less particles that pass through a sieve having a nominal opening of 250 μm and do not pass through a sieve having a nominal opening of 180 μm; about 4% and more to about 20% or less particles that pass through a sieve having a nominal opening of 180 μm and do not pass through a sieve having a nominal opening of 150 μm; and about 0% and more to about 10% or less particles that pass through a sieve having a nominal opening of 150 μm, wherein the Vickers microhardness of the particles that do not pass through a sieve having a nominal opening of 150 μm is at most about 110. The iron powder does not substantially contain particles that do not pass through a sieve having a nominal opening of 1 mm.

According to a second aspect of the invention, a highly compressible iron powder for powder metallurgy comprises, on the basis of mass percent of fractions after sieve classification using sieves defined in Japanese Industrial Standard (JIS) Z 8801-1:00 Edition 2000), substantially 0% particles that do not pass through a sieve having a nominal opening of 1 mm; more than 0.0% to about 2% or less particles that pass through a sieve having a nominal opening of 1 mm and do not pass through a sieve having a nominal opening of 180 μm; about 30% and more to about 70% or less particles that pass through a sieve having a nominal opening of 180 μm and do not pass through a sieve having a nominal opening of 150 μm;

and about 20% and more to about 60% or less particles that pass through a sieve having a nominal opening of 150 μm, wherein the Vickers microhardness of the particles that do not pass through a sieve having a nominal opening of 150 μm is at most about 110. Also, the iron powder does not substantially contain particles that do not pass through a sieve having a nominal opening of 1 mm.

Preferably, the impurity contents in the iron powder, on the basis of mass percent, are: C≤ about 0.1%, S≤ about 0.1%, Mn≤ about 0.5%, P< about 0.02%, S≤ about 0.01%, O≤ about 1%, and about 0.01%. More preferably, the impurity contents in the iron powder, on the basis of mass percent, are: C≤ about 0.005%, Si≤ about 0.01%, Mn≤ about 0.05%, P≤ about 0.01%, S≤ about 0.01%, O≤ about 0.10%, and about 0.003%.

Preferably, the iron powder is formed by a water atomizing process.

The highly compressible iron powder according to the invention is suitable for production of magnetic parts having high magnetism and mechanical parts having high mechanical strength.

DETAILED DESCRIPTION

The particle size distribution of iron powder in the invention is based on the mass percent of fractions after sieve classification using sieves defined in JIS Z 8801-1:00 (Edition 2000). For example, when particles pass through a sieve having a nominal opening of 1 mm but do not pass through a sieve having a nominal opening of 180 μm, the particle size is referred to as −1 mm/+180 μm. Also, when particles pass through a sieve having a nominal opening of 150 μm, the particle size is referred to as −150 μm. Furthermore, when particles do not pass through the sieve having the nominal opening of 150 μm, the particle size is referred to as +150 μm.

A highly compressible iron powder according to a first embodiment will now be described.

In the first embodiment, the maximum particle size of the iron powder is limited to 1 mm for the following reason. If the iron powder contains large amounts of particles exceeding 1 mm, these large particles are preferentially distributed to fine indented portions and corners of the die. Since these indented portions and corners are not filled with finer particles, the compacted part has rough pores on the surface and uneven density. The compacted part does not exhibit high magnetism when used as a magnetic powder core or magnetic sintered core.

In the first embodiment, the iron powder contains more than 0% to about 45% or less particles having a particle size of −1 mm/+250 μm, about 30% and more to about 65% or less particles having a particle size of −250 μm/+180 μm, and about 4% and more to about 20% or less particles having a particle size of −180 μm/+150 μm. In summary, the iron powder contains large proportions of course particles having a particle size of −1 mm/+150 μm.

In contrast, the iron powder contains a reduced amount of fine particles having a particle size of −150 μm for the following reason. During compacting, reducing the proportion of the fine particles having a large specific area decreases friction resistance between iron powder particles and, thus, improves flowability of the iron powder. In actual cases, trace amounts of fine particles having a particle size of −150 μm may be unavoidably contained when the observed content of these fine particles is about 0%.

The iron powder has a particle size distribution containing relatively large amounts of course particles if the particles having a particle size of −1 mm/+250 μm exceed 45%, if the particles having a particle size of −250 μm/+180 μm exceed 65%, or if the particles having a particle size of −180 μm/+150 μm exceed 20%. The compacted parts have many internal voids and rough surfaces because such an iron powder forms large pores between the course particles during compacting. Accordingly, the compacted parts have poor appearance and do not exhibit high magnetism when the compacted parts are magnetic powder cores or magnetic sintered cores.

On the other hand, the iron powder has a particle size distribution containing reduced amounts of course particles and, thus, increased amounts of fine particles if the particles having a particle size of −250 μm/+180 μm is less than about 30%, if the particles having a particle size of −180 μm/+150 μm is less than about 4%, or if the particles having a particle size of −150 μm exceed about 10%. The green compacts have low density due to the restricted movement of the particles during compacting because such an iron powder increases frictional resistance between iron particles during the compaction.

Furthermore, the particles having a particle size of +150 μm are softened so that the Vickers microhardness of the particles is at most about 110. Thus, the iron powder is highly compressible during compaction.

The Vickers microhardness is measured at a light load according to a Vickers hardness measurement method defined by JIS Z 2244 (Ed. 1998). In the invention, the Vickers microhardness is measured at a load (test force) of 0.245 N.

As described above, in the first embodiment, the iron powder has a specific particle size distribution and the Vickers microhardness of coarse iron particles having a particle size of +150 μm is limited to about 110 or less. Thus, the soft iron powder is highly compressible and readily forms high-density magnetic or mechanical parts.

A method for softening the iron particles such that the Vickers microhardness of the coarse particles having a particle size of +150 μm is at most about 110 will now be described.

In the case of a water atomized iron powder formed by atomizing molten steel in water, the water atomized iron powder is dried and heated in a hydrogen reducing atmosphere in a reduction furnace to remove oxide formed on the surfaces of iron particles. The iron powder is reduced by a high-load treatment in which the reducing temperature is somewhat higher than the ordinary temperature and the total reducing time is somewhat longer than the ordinary time to soften the coarse iron particles in the reducing furnace.

In the invention, reduction is generally performed at a temperature of about 850° C. to about 1,000° C. for a total time of about 30 minutes to about 3 hours, preferably about 1 to about 3 hours in a reducing atmosphere, although these reducing conditions depend on the type of reducing furnace. Reduction is preferably repeated several times, preferably 2 or 3 times, and disintegration steps are interposed between these reduction steps.

Since fine iron particles having a particle size of about −150 μm have a large specific area and are readily reduced compared with coarse iron particles, these particles are readily softened under ordinary reducing conditions. Thus, the fine iron particles are not significantly hardened compared with the coarse iron particles. Thus, the Vickers microhardness of the fine particles does not exceed about 100 after conventional water atomizing processes and after the high-load treatment due to a slight difference in the Vickers microhardness change during the reduction.

Even in methods other than water atomizing, the reduction treatment is essentially applied for softening the iron powder. The above high-load treatment is also applicable to softening the iron powder in the methods.

Iron powder having the above-mentioned particle size distribution is prepared by reducing the water-atomized iron powder or iron oxide powder such as mill scales, disintegrating the reduced iron powder, and then classifying the disintegrated powder. Preferably, the steps from the reduction to the classification are repeated several times. Alternatively, iron powder having the above-mentioned particle size distribution may be prepared according to the order of classification, reduction, and disintegration. The iron powder is disintegrated under mild conditions that apply small impact force to iron particles so that the maximum value of the Vickers microhardness of the coarse particles having a particle size of +150 μm does not exceed about 110.

In conventional water-atomized iron powder, coarse classified particles having a particle size of +150 μm have a Vickers microhardness exceeding 110 due to low-load reduction conditions. The Vickers microhardness of iron particles having a particle size of +150 μm and the Vickers microhardness of iron particles having a particle size of −150 μm are measured as follows. Iron particles for each particle size are mixed with a two-liquid type thermosetting resin. After the resin is cured, the surface of the resin is polished to expose the sections of the iron particles. Using a Vickers microhardness tester, a load of 0.245 N is applied to each section to measure the hardness. Measurements were carried out at least for 20 particles in each particle size.

Table 1 includes the density of each of a number of green compacts (compacted articles) composed of iron powder according to the first embodiment and compacted at room temperature (about 25° C.) under the three conditions shown in Table 2. Table 1 also includes reduction conditions for producing iron powders.

The green compact is a disk having a diameter of 11 mm and a thickness of 10 mm, and the density of the green compact is measured by the Archimedes method, in which the green density is determined by measuring the weight and the volume of the green compact measured by immersing the green compact into water.

In Table 1, the Vickers microhardness is measured at a load (test force) of 0.245 N. Iron Powders A9 and A18 are produced by reduction of mill scales (iron oxide). Furthermore, Composition S1 contains 0.001% C, 0.008% Si, 0.030% Mn, 0.008% P, 0.007% S, 0.088% O, and 0.002% N, on the basis of mass percent, the balance being iron and incidental impurities. Composition S2 contains 0.002% C, 0.008% Si, 0.053% Mn, 0.007% P, 0.006% S, 0.096% O, and 0.005% N, on the basis of mass percent, the balance being iron and incidental impurities. Also, Composition S3 contains 0.050% C, 0.048% Si, 0.28% Mn, 0.010% P, 0.006% S, 0.521% O, and 0.003% N, on the basis of mass percent, the balance being iron and incidental impurities.

The iron powder (A13) according to Conventional Example 1 is a commercially available iron powder (KIP(R) 304A manufactured by Kawasaki Steel Co.). The iron powder (A14) according to Conventional Example 2 corresponds to a pure iron powder for powder metallurgy described in JP-B2-8-921.

TABLE 1

| Iron Powder | | | | | | | |
|---|---|---|---|---|---|---|---|
| Type of Iron Powder | Particle Size Distribution (mass %) | | | | Vickers Microhardness | | Composition |
| | −1000/+250 μm | −250/+180 μm | −180/+150 μm | −150 μm | +150 μm (Maximum) | −150 μm (Average) | |
| A1 | 33.1 | 56.9 | 8.8 | 1.2 | 86 | 75 | S1 |
| A2 | 40.2 | 49.1 | 8.7 | 2.0 | 85 | 81 | S1 |
| A3 | 38.2 | 50.8 | 8.6 | 2.4 | 101 | 85 | S1 |
| A4 | 40.0 | 55.2 | 4.6 | 0.2 | 85 | 76 | S1 |
| A5 | 42.5 | 53.1 | 4.4 | 0.0 | 88 | — | S1 |
| A6 | 36.5 | 38.7 | 18.3 | 6.5 | 95 | 85 | S1 |
| A7 | 34.2 | 55.6 | 9.1 | 1.1 | 93 | 83 | S1 |
| A8 | 25.0 | 56.8 | 15.3 | 2.9 | 95 | 82 | S1 |
| A9 | 40.9 | 55.1 | 4.2 | 0.3 | 78 | 70 | S3 |
| A10 | 33.8 | 56.5 | 8.6 | 1.1 | 105 | 81 | S2 |
| A11 | 34.8 | 56.2 | 8.7 | 1.3 | 153 | 83 | S1 |
| A12 | — | 54.2 | 28.2 | 17.6 | 181 | 87 | S1 |
| A13 | — | 0.6 | 7.9 | 91.5 | 164 | 89 | S1 |
| A14 | — | −250 μm/+150 μm: 10 | | 90.0 | 155 | 87 | S1 |
| A15 | 50.1 | 35.2 | 12.5 | 2.2 | 102 | 85 | S1 |
| A16 | 36.1 | 60.0 | 3.2 | 0.7 | 99 | 81 | S1 |
| A17 | 24.7 | 45.0 | 25.5 | 4.8 | 101 | 88 | S2 |
| A18 | 29.6 | 50.0 | 8.7 | 11.7 | 91 | 81 | S3 |

| Manufacturing Method | | | | | Density of Green Compact at Compaction Conditions ($Mg/m^3$) | | | |
|---|---|---|---|---|---|---|---|---|
| Type of Iron Powder | Powder Production | Reduction Conditions* First Reduction | Second Reduction | Third Reduction | A | B | C | Note |
| A1 | Water Atomized | $H_2$, 1000° C., 2 h | | | 7.23 | 7.34 | 7.77 | Example |
| A2 | Water Atomized | $H_2$, 950° C., 1 h | $H_2$, 900° C., 1 h | $H_2$, 950° C., 0.5 h | 7.24 | 7.35 | 7.78 | Example |
| A3 | Water Atomized | $H_2$, 850° C., 1 h | $H_2$, 850° C., 1 h | | 7.21 | 7.32 | 7.75 | Example |
| A4 | Water Atomized | $H_2$, 950° C., 1 h | $H_2$, 950° C., 1 h | $H_2$, 900° C., 1 h | 7.22 | 7.33 | 7.78 | Example |

TABLE 1-continued

| Iron Powder | | | | | | | |
|---|---|---|---|---|---|---|---|
| A5 | Water Atomized | $H_2$, 900° C.. 1 h | $H_2$, 900° C., 1 h | 7.22 | 7.33 | 7.76 | Example |
| A6 | Water Atomized | $H_2$, 850° C., 1 h | $H_2$, 800° C., 1 h | 7.21 | 7.31 | 7.74 | Example |
| A7 | Water Atomized | $H_2$, 850° C., 1 h | $H_2$, 800° C., 1 h | 7.20 | 7.30 | 7.75 | Example |
| A8 | Water Atomized | $H_2$, 800° C., 1 h | $H_2$, 800° C., 1 h | 7.22 | 7.31 | 7.74 | Example |
| A9 | Reduced | $H_2$, 850° C., 1 h | $H_2$, 850° C., 1 h | 7,20 | 7,30 | 7.73 | Example |
| A10 | Water Atomized | $H_2$, 900° C., 1 h | $H_2$, 900° C., 1 h | 7.20 | 7.31 | 7.74 | Example |
| A11 | Water Atomized | $H_2$, 750° C., 0.5 h | | 7.03 | 7.25 | 7.68 | Comparative Example |
| A12 | Water Atomized | $H_2$, 950° C., 1.5 h | | 7.04 | 7.26 | 7.68 | Comparative Example |
| A13 | Water Atomized | $H_2$, 750° C., 0.5 h | | 7.01 | 7.21 | 7.64 | Conventional Example 1 |
| A14 | Water Atomized | $H_2$, 750° C., 0.5 h | | 7.03 | 7.22 | 7.65 | Conventional Example 2 |
| A15 | Water Atomizing | $H_2$, 950° C., 1.5 h | | 7.05 | 7.22 | 7.68 | Comparative Example |
| A16 | Water Atomized | $H_2$, 900° C., 1 h | $H_2$, 850° C., 1 h | 7.05 | 7.23 | 7.69 | Comparative Example |
| A17 | Water Atomized | $H_2$, 900° C., 1 h | $H_2$, 850° C., 1 h | 7.04 | 7.22 | 7.67 | Comparative Example |
| A18 | Reduced | $H_2$, 800° C., 1 h | $H_2$, 800° C., 1 h | 7.03 | 7.18 | 7.65 | Comparative Example |

*Order: atmospheric gas, reduction temperature, and reduction time.
The powder was disintegrated and classified after every reduction treatment.

TABLE 2

| Compacting Condition | Addition of Lubricant (Zinc Stearate) to Iron Powder* | Application of Lubricant (Zinc Stearate) to Die** | Compacting Pressure (MPa) |
|---|---|---|---|
| A | Added | Not coated | 490 |
| B | Not added | Coated | 490 |
| C | Not added | Coated | 1177 |

*0.75 mass percent in the mixed powder
**Zinc stearate dispersed in alcohol by 5 mass percent is coated so that about 0.1 to 0.5 g of zinc stearate is applied.

Table 1 shows that iron powders according to the first embodiment of the invention are highly compressible compared with other iron powders.

In Table 1, the Vickers microhardness of the particles having a particle size of +150 μm is the maximum, whereas the Vickers microhardness of the particles having a particle size of −150 μm is the average (arithmetic average). No particles among the particles having the particle size of −150 μm have a Vickers microhardness exceeding 100.

The impurity contents in the iron powder, on the basis of mass percent, are preferably C≤ about 0.1%, S≤ about 0.1%, Mn≤ about 0.5%, P≤ about 0.02%, S≤ about 0.01%, O≤ about 1%, and N≤ about 0.01%, and more preferably C≤ about 0.005%, Si≤ about 0.01%, Mn≤ about 0.05%, P≤ about 0.01%, S≤ about 0.01%, O≤ about 0.10%, and N≤ about 0.003%. If any impurity content exceeds the above upper limit, the compactness of the iron powder is somewhat impaired.

Preferably, in the iron powder, the balance is iron and other impurities. The lower limits of the contents for the above-mentioned impurities are not limited in the first embodiment. These lower limits in general industrial processes are C≥ about 0.0005%, Si ≥ about 0.001%, Mn≥ about 0.01%, P≥ about 0.001%, S≥ about 0.001%, O≥about 0.05% and about 0.001%.

The surfaces of the iron powder according to the first embodiment may be partially alloyed by using powdered Ni, Cu, or Mo, etc. in which the iron powder and alloying powder are in contact with each other only at the surfaces thereof and are partially alloyed. Alternatively, the alloying powder may be bonded to the iron powder by using a binder. The maximum content of each alloying powder is about 6%.

In the first embodiment, the iron powder is preferably produced by the above-described water atomizing process since the iron powder can be produced by a low-cost procedure, that is, by jetting high-pressure water into a molten steel stream.

Using the highly compressible iron powder according to the first embodiment, magnetic parts having excellent magnetic characteristics are readily produced, as described in Example 1 (Application to Magnetic parts).

A highly compressible iron powder according to a second embodiment will now be described.

Because only one difference between the first embodiment and the second embodiment is the particle size distribution of the iron powder, the following description is focused on this point.

Also, in the second embodiment, the particles having a particle size of +150 μm are softened so that the Vickers microhardness of the particles is at most about 110. The reason and method for softening the iron particles are the same as those in the first embodiment.

In the second embodiment, the maximum particle size of the iron powder used in the second embodiment is limited to about 1 mm. If the iron powder contains particles exceeding about 1 mm, these large particles are preferentially distributed to fine indented portions and corners of the die. The green compact has rough pores on the surface and uneven density since these indented portions and corners are not filled with finer particles. The part does not exhibit high magnetism when such a part is a magnetic powder core or magnetic sintered core.

Furthermore, these pores act as origin points of fatigue failure when the green compact is sintered and used as a mechanical part. Thus, this mechanical part exhibits decreased mechanical strength and, particularly, decreased fatigue strength. Furthermore, the sintering process for the mechanical part inevitably requires a high-temperature load treatment in which the part is sintered at a high temperature for a long time such that the alloying element is sufficiently diffused into the interior of each coarse particle. If the diffusion of the alloying metal is insufficient, the hardenability of the sinter does not sufficiently increase during hardening for enhancing the strength, for example, carburizing hardening, bright hardening, or induction hardening. As a result, a relatively soft phase such as ferrite or pearlite structure is formed in some cases. So as to prevent such a texture increases in coarse particles and a decrease in fatigue strength, the iron powder must be sintered at a high-temperature load environment, resulting in an increase in production cost of the part. Accordingly, the maximum particle size of the iron powder in the second embodiment is limited to about 1 mm In the second embodiment, the iron powder contains more than about 0.0% to about 2% or less particles having a particle size of −1 mm/+180 μm, which pass through the sieve having the nominal opening of 1 mm and do not pass through a sieve having a nominal opening of 180 μm; about 30% and more to about 70% or less particles having a particle size of −180 μm/+150 μm, which pass through a sieve having a nominal opening of 180 μm and do not pass through a sieve having a nominal opening of 150 μm; and about 20% and more to about 60% or less particles having a particle size of −150 μm, which pass through a sieve having a nominal opening of 150 μm. This iron powder having such a particle size distribution has a high apparent density.

Since the iron powder according to the second embodiment contains a larger fraction of fine particles than that in the iron powder according to the first embodiment, the frictional resistance between particles tends to increase during compacting. However, in this particle size distribution, fine particles lie in the interstices between the coarse particles so that the apparent density increases, producing high-density compacted products by the compaction.

The above particle size distribution is important for the iron powder to achieve such a high apparent density. The density of a green compact produced by compacting decreases due to a decreased apparent density of the iron powder if the particles having a particle size of −1 mm/+180 μm is 0.0% or more than about 2%, if the particles having a particle size of −180 μm/+150 μm is less than about 30% or more than about 70%, or if the particles having a particle size of −150 μm is less than about 20% or more than about 60%.

Also in the second embodiment, the Vickers microhardness of the fine particles passing through the sieve having the nominal opening of 150 μm is about 100 or less, which is the same level as that of a conventional water-atomized iron powder having the same particle size.

Table 3 includes the density of each of a number of green compacts (compacted articles) composed of the iron powder according to the second embodiment and compacted at room temperature (about 25° C.) under the three conditions shown in Table 2. Table 3 also includes reduction conditions for producing iron powders.

The size of the green compact, the method for measuring the density of the green compact, and the method for measuring the hardness of the iron powder are the same as those in the first embodiment.

In Table 3, the Vickers microhardness is measured at a load (test force) of 0.245 N. Iron Powders B9 and B18 are produced by reduction of mill scales (iron oxide). Furthermore, Composition S4 contains 0.002% C, 0.008% Si, 0.030% Mn, 0.007% P, 0.006% S, 0.088% O, and 0.003% N, on the basis of mass percent, the balance being iron and incidental impurities. Composition S5 contains 0.001% C, 0.007% Si, 0.025% Mn, 0.008% P, 0.006% S, 0.132% O, and 0.002% N, on the basis of mass percent, the balance being iron and incidental impurities. Also, Composition S6 contains 0.030% C, 0.041% Si, 0.23% Mn, 0.011% P, 0.007% S, 0.296% O, and 0.003% N, on the basis of mass percent, the balance being iron and incidental impurities.

The iron powder (B14) according to Conventional Example 3 is a commercially available iron powder (KIP(R) 304A). The iron powder (B15) according to Conventional Example 4 corresponds to a pure iron powder for powder metallurgy described in JP-B2-8-921.

TABLE 3

| Iron Powder | | | | | | |
|---|---|---|---|---|---|---|
| Type of Iron Powder | Particle Size Distribution (mass %) | | | Vickers Microhardness | | Composition |
| | −1000/+180 μm | −180/+150 μm | −150 μm | +150 μm (Maximum) | −150 μm (Average) | |
| B1 | 0.6 | 52.2 | 47.2 | 89 | 83 | S4 |
| B2 | 0.5 | 54.6 | 44.9 | 95 | 82 | S4 |
| B3 | 0.6 | 51.3 | 48.1 | 105 | 87 | S4 |
| B4 | 0.1 | 44.7 | 55.2 | 93 | 85 | S4 |
| B5 | 1.8 | 61.5 | 36.7 | 87 | 81 | S4 |
| B6 | 1.0 | 49.8 | 40.2 | 99 | 89 | S4 |
| B7 | 0.8 | 44.9 | 54.3 | 101 | 89 | S4 |
| B8 | 1.5 | 67.2 | 31.3 | 90 | 81 | S4 |
| B9 | 0.6 | 55.5 | 43.9 | 79 | 76 | S6 |
| B10 | 0.6 | 52.1 | 47.3 | 87 | 81 | S5 |
| B11 | 1.8 | 39.1 | 59.1 | 91 | 85 | S4 |
| B12 | 0.2 | 10.5 | 89.3 | 93 | 83 | S4 |
| B13 | 0.5 | 48.8 | 50.7 | 189 | 87 | S4 |
| B14 | −250 μm/+150 μm: 8.5 | | 91.5 | 164 | 89 | S4 |
| B15 | −250 μm/+150 μm: 10 | | 90.0 | 155 | 87 | S4 |
| B16 | 0 | 54.0 | 45.5 | 95 | 83 | S4 |
| B17 | 3.5 | 55.1 | 41.4 | 98 | 89 | S5 |
| B18 | 1.3 | 34.1 | 64.6 | 93 | 86 | S6 |

TABLE 3-continued

| Iron Powder | | | | | | | | |
|---|---|---|---|---|---|---|---|---|
| Manufacturing Method | | | | | Density of Green Compact at Compaction Conditions ($Mg/m^3$) | | | |
| Type of Iron Powder | Powder Production | Reduction Conditions* First Reduction | Second Reduction | Third Reduction | A | B | C | Note |
| B1 | Water Atomized | $H_2$, 1000° C., 0.5 h | $H_2$, 950° C., 0.5 h | $H_2$, 950° C., 0.5 h | 7.22 | 7.31 | 7.78 | Example |
| B2 | Water Atomized | $H_2$, 900° C., 1 h | $H_2$, 900° C., 1 h | | 7.20 | 7.30 | 7.76 | Example |
| B3 | Water Atomized | $H_2$, 900° C., 1 h | $H_2$, 850° C., 1 h | | 7.20 | 7.29 | 7.74 | Example |
| B4 | Water Atomized | $H_2$, 950° C., 1 h | $H_2$, 950° C., 1 h | $H_2$, 900° C., 1 h | 7.22 | 7.31 | 7.78 | Example |
| B5 | Water Atomized | $H_2$, 900° C., I h | $H_2$, 900° C., 1 h | | 7.21 | 7.30 | 7.78 | Example |
| B6 | Water Atomized | $H_2$, 950° C., 1 h | $H_2$, 950° C., 0.5 h | | 7.22 | 7.31 | 7.77 | Example |
| B7 | Water Atomized | $H_2$, 850° C., 1 h | $H_2$, 800° C., 1 h | | 7.21 | 7.30 | 7.76 | Example |
| B8 | Water Atomized | $H_2$, 950° C., 1 h | $H_2$, 950° C., 1 h | | 7.22 | 7.31 | 7.78 | Example |
| B9 | Reduced | $H_2$, 850° C., 1 h | $H_2$, 850° C., 1 h | | 7.20 | 7.29 | 7.74 | Example |
| B10 | Water Atomized | $H_2$, 1000° C., 0.5 h | | | 7.21 | 7.30 | 7.74 | Example |
| B11 | Water Atomized | $H_2$, 900° C., 1 h | $H_2$, 900° C., 1 h | | 7.22 | 7.29 | 7.76 | Example |
| B12 | Water Atomized | $H_2$, 850° C., 1 h | $H_2$, 850° C., 1 h | | 7.05 | 7.22 | 7.66 | Comparative Example |
| B13 | Water Atomized | $H_2$, 800° C., 1 h | | | 7.10 | 7.25 | 7.67 | Comparative Example |
| B14 | Water Atomized | $H_2$, 750° C., 0.5 h | | | 7.01 | 7.21 | 7.64 | Conventional Example 3 |
| B15 | Water Atomized | $H_2$, 800° C., 0.5 h | | | 7.03 | 7.22 | 7.65 | Conventional Example 4 |
| B16 | Water Atomized | $H_2$, 850° C., 1 h | $H_2$, 800° C., 1 h | | 7.08 | 7.26 | 7.68 | Comparative Example |
| B17 | Water Atomized | $H_2$, 900° C., 1 h | $H_2$, 850° C., 1 h | | 7.07 | 7.25 | 7.67 | Comparative Example |
| B18 | Reduced | $H_2$, 800° C., 1 h | $H_2$, 800° C., 1 h | | 7.05 | 7.23 | 7.66 | Comparative Example |

*Order: atmospheric gas, reduction temperature, and reduction time.
The powder was disintegrated and classified after every reduction treatment.

Table 3 shows that each green compact according to the invention has a high density and the corresponding iron powder according to the second embodiment of the invention is highly compressible compared with other iron powders.

In Table 3, the Vickers microhardness of the particles having a particle size of +150 μm is the maximum, whereas the Vickers microhardness of the particles having a particle size of −150 μm is the average. No particles among the particles having the particle size of −150 μm have a Vickers microhardness exceeding about 100.

Using the highly compressible iron powder according to the second embodiment, mechanical parts having high bearing fatigue strength and magnetic parts having excellent magnetic characteristics are readily produced, as described in Example 2 (Application to Mechanical Parts) and Example 3 (Application to Magnetic parts).

The iron powders according to the first embodiment and the second embodiment can be applied to various fields and, particularly, magnetic parts. In particular, the iron powder according to the second embodiment is also suitable for mechanical parts.

EXAMPLES

Example 1-1

Application of Iron Powder According to First Embodiment to Magnetic Part (Green Compact)

Each of iron powders (A1 to A10) according to the invention shown in Table 1 was compacted in a die under a pressure of 1,177 MPa to form a ring shaped magnetic core (magnetic powder core) having an outer diameter of 35 mm, an inner diameter of 20 mm, and a height of 6 mm The flux density of the resulting the magnetic powder core was measured.

Each of the iron powders (A1 to A10) according to the invention was dipped into a phosphoric acid (1 mass percent) in ethanol solution and was dried for insulation treatment. Before compacting, zinc stearate dispersed in alcohol by 5 mass percent was coated on the surfaces of the die for lubrication so that about 0.1 to 0.5 g of zinc stearate was applied.

The flux density was measured as follows: Around the ring magnetic powder core, a primary coil was wound by 100 turns and a secondary coil was wound by 40 turns. While a gradually increasing current $i_1$ was applied to the primary coil, a current $i_2$ occurring in the secondary coil was accumulated in an accumulator to determine the flux density. The maximum of the current $i_1$ was set so that the applied magnetic field became 1,000 A/m. The density of the magnetic powder core was determined from the dimensions (the outer diameter, the inner diameter, and the height) and the mass of the ring shaped test piece.

Each of iron powders (A11 to A14) as Comparative Examples (include Conventional Examples, hereinafter) shown in Table 1 was also compacted as in the iron powders according to the invention form a ring magnetic powder core. Table 4 shows the density and the flux density of each magnetic powder core.

TABLE 4

| Iron Powder | Magnetic Powder Core (Green compact) Density (Mg/m$^3$) | Flux density (T) | Note Particle Size Distribution and Hardness of Iron Powder |
|---|---|---|---|
| A1 | 7.76 | 1.76 | Table 1 Example |
| A2 | 7.77 | 1.77 | Table 1 Example |
| A3 | 7.73 | 1.75 | Table 1 Example |
| A4 | 7.77 | 1.80 | Table 1 Example |
| A5 | 7.74 | 1.73 | Table 1 Example |
| A6 | 7.71 | 1.72 | Table 1 Example |
| A7 | 7.73 | 1.74 | Table 1 Example |
| A8 | 7.72 | 1.72 | Table 1 Example |
| A9 | 7.70 | 1.74 | Table 1 Example |
| A10 | 7.69 | 1.72 | Table 1 Example |
| A11 | 7.63 | 1.65 | Table 1 Comparative Example |
| A12 | 7.61 | 1.63 | Table 1 Comparative Example |
| A13 | 7.60 | 1.63 | Table 1 Conventional Example 1 |
| A14 | 7.59 | 1.60 | Table 1 Conventional Example 2 |

Table 4 shows that, using Iron Powders A1 to A10 according to the first embodiment, green compacts having higher density can be produced compared with the green compacts formed of Iron Powders A11 to A14 for Comparative Examples. Thus, the iron powder according to the first embodiment is suitable for magnetic parts requiring excellent magnetic characteristics.

Example 1-2

Application of Iron Powder According to First Embodiment to Magnetic Sintered Part (Sintered Body)

Each of iron powders (A1 to A10) according to the invention shown in Table 1 was compacted in a die under a pressure of 1,177 MPa to form a green compact. The green compact was sintered to form a ring magnetic sintered core having an outer diameter of 35 mm, an inner diameter of 20 mm, and a height of 6 mm. The flux density of the resulting magnetic sintered core was measured.

For each iron powder shown in Table 1, 0.2 parts by weight of powdered zinc stearate was added to 100 parts by weight of iron powder. Before compacting, zink stearate dispersed in alcohol by 5 mass percent was coated on the surfaces of the die for lubrication so that about 0.1 to 0.5 g of zinc stearate was applied. Sintering was performed at 1,250° C. for 1 hour in a 10-volume percent $H_2$—$N_2$ atmosphere. The density of the magnetic sintered core was measured as in Example 1-1.

Each of iron powders (A11 and A12) as Comparative Examples and iron powders (A13 and A14) as Conventional Examples shown in Table 1 was also compacted as in the iron powders according to the invention form a ring shaped magnetic sintered core. Table 5 shows the density and the flux density of each magnetic sintered core.

TABLE 5

| Iron Powder | Magnetic Sintered Core (Sintered Body) Density (Mg/m$^3$) | Flux density (T) | Note Particle Size Distribution and Hardness of Iron Powder |
|---|---|---|---|
| A1 | 7.77 | 1.76 | Table 1 Example |
| A2 | 7.78 | 1.79 | Table 1 Example |
| A3 | 7.73 | 1.76 | Table 1 Example |
| A4 | 7.77 | 1.80 | Table 1 Example |
| A5 | 7.75 | 1.75 | Table 1 Example |
| A6 | 7.72 | 1.73 | Table 1 Example |
| A7 | 7.73 | 1.75 | Table 1 Example |
| A8 | 7.72 | 1.72 | Table 1 Example |
| A9 | 7.71 | 1.75 | Table 1 Example |
| A10 | 7.69 | 1.73 | Table 1 Example |
| A11 | 7,63 | 1.66 | Table 1 Comparative Example |
| A12 | 7.62 | 1.64 | Table 1 Comparative Example |
| A13 | 7.61 | 1.65 | Table 1 Conventional Example 1 |
| A 14 | 7.61 | 1.61 | Table 1 Conventional Example 2 |

Table 5 shows that, using Iron Powders A1 to A10 according to the first embodiment, magnetic sintered cores having higher density can be produced compared with the sintered cores formed of Iron Powders A11 to A14 for Comparative Examples. Thus, the iron powder according to the first embodiment is suitable for magnetic parts requiring excellent magnetic characteristics.

Example 2

Application of Iron Powder According to Second Embodiment to Mechanical Sintered Part Each of iron powders (B1, B4, and B12 to B15) shown in Table 3 was compacted in a die under a pressure of 1,177 MPa to form a green compact. The green compact was sintered to form a disk specimen having a diameter of 60 mm and a thickness of 10 mm. As a mechanical strength, the bearing fatigue strength of the resulting disk sintered specimen was measured.

Before compaction, each iron powder was mixed with an alloying powder (except for graphite powder) and the mixture was heated at 850° C. for 1 hour in hydrogen having a dew point of 40° C. to form a partially alloyed steel powder. Each partially alloyed steel powder contained 4.0 mass percent Ni, 1.5 mass percent Cu, and 0.5 mass percent Mo, or 1.0 mass percent Mo. The particle size distribution of the powder did not change by partially alloying. The partially alloyed steel powder and graphite powder were mixed, and the mixture was compacted in a die. Before compaction, zinc stearate dispersed in alcohol by containing 5 mass percent was coated to the surfaces of the die for lubrication so that about 0.1 to 0.5 g of zinc stearate was applied.

Sintering was performed at 1,250° C. for 1 hour in a 10-volume percent H2—$N_2$ atmosphere. The resulting sintered body was subjected to carburizing hardening-tempering, or bright hardening. The carburizing heat treatment was performed by carburizing at 920° C. for 150 minutes in a carbon potential of 0.9% and then at 850° C. for 45 minutes in a carbon potential of 0.7%, by hardening in oil at 60° C., and by tempering for 60 minutes in oil at 180° C. The bright hardening was performed by keeping at 925° C. for 60 minutes in an Ar atmosphere and by hardening in oil at 60° C.

Bearing fatigue strength was measured using a Mori-type bearing fatigue strength tester as follows: Mirror-polished disk shaped test pieces having a diameter of 60 mm and a thickness of 5 mm were prepared. Six steel balls with a diameter of ¾ inch were rolling and rotating on a circle having a radius of about 20 mm on the surface of the plane surface of the disk at 1,000 rpm in order to apply repeated fatigues to the test piece. The number of rotations until a surface defect formed was measured. The bearing fatigue strength was determined by the load Sat $N=10^7$ on an S-N curve that is obtained from different loads S for different disk test pieces. The density of the heat-treated body was determined by the Archimedes method.

Table 6 shows the density and bearing fatigue strength of the heat-treated bodies.

TABLE 6

| Iron Powder | Mechanical Parts (Heat Treated Bodies) Density ($Mg/m^3$) | Bearing Fatigue Strength (GPa) | Particle Size Distribution and Hardness of Iron Powder | Alloy* | Graphite** (mass percent) | Annealing*** | Note |
|---|---|---|---|---|---|---|---|
| B1 | 7.76 | 4.4 | Table 3 | NCM | 0.3 | CQT | Example |
| B1 | 7.73 | 4.1 | Table 3 | NCM | 0.6 | BQT | Example |
| B1 | 7.70 | 4.0 | Table 3 | M | 0.3 | CQT | Example |
| B1 | 7.68 | 3.9 | Table 3 | M | 0.6 | BQT | Example |
| B4 | 7.75 | 4.3 | Table 3 | NCM | 0.3 | CQT | Example |
| B4 | 7.74 | 4.3 | Table 3 | NCM | 0.6 | BQT | Example |
| B4 | 7.70 | 4.1 | Table 3 | M | 0.3 | CQT | Example |
| B4 | 7.69 | 4.0 | Table 3 | M | 0.6 | BQT | Example |
| B12 | 7.60 | 3.2 | Table 3 | NCM | 0.3 | CQT | Comparative Example |
| B13 | 7.67 | 3.0 | Table 3 | M | 0.6 | BQT | Comparative Example |
| B14 | 7.59 | 3.1 | Table 3 | NCM | 0.3 | CQT | Conventional Example 1 |
| B15 | 7.60 | 3.1 | Table 3 | NCM | 0.6 | BQT | Conventional Example 2 |

*NCM: 4.0 mass percent Ni-1.5 mass percent Cu-0.5 mass percent Mo M: 1.0 mass percent Mo
**Content to the total of the partially alloyed iron powder and the graphite powder.
***CQT: Carburizing Hardening Treatment BQT: Brightness Hardening Treatment Table 6 shows that, using Iron Powders B1 to B4 according to the second embodiment, mechanical parts having higher density can be produced compared with the sintered bodies formed of Iron Powders B12 and B13 for Comparative Examples and B14 and B15 for Conventional Examples. Thus, the iron powder according to the second embodiment is suitable for mechanical parts requiring high mechanical strength.

Example 3-1

Application of Iron Powder According to Second Embodiment to Magnetic Part (Green Compact)

Using iron powders shown in Table 3, magnetic powder cores (green compacts) were produced as in EXAMPLE 1-1 and the density and magnetic flux of each magnetic powder core were measured. The results are shown in Table 7.

TABLE 7

| Iron Powder | Magnetic Powder core (Green compact) Density ($Mg/m^3$) | Flux density (T) | Note Particle Size Distribution and Hardness of Iron Powder |
|---|---|---|---|
| B1 | 7,78 | 1.81 | Table 3 Example |
| B2 | 7.75 | 1.76 | Table 3 Example |
| B3 | 7.73 | 1.75 | Table 3 Example |
| B4 | 7.77 | 1.80 | Table 3 Example |
| B5 | 7.77 | 1.78 | Table 3 Example |
| B6 | 7.76 | 1.77 | Table 3 Example |
| B7 | 7.75 | 1.76 | Table 3 Example |
| B8 | 7.77 | 1.80 | Table 3 Example |
| B9 | 7.73 | 1.72 | Table 3 Example |
| B10 | 7.73 | 1.75 | Table 3 Example |
| B12 | 7.63 | 1.65 | Table 3 Comparative Example |
| B13 | 7.65 | 1.66 | Table 3 Comparative Example |

TABLE 7-continued

| Iron Powder | Magnetic Powder core (Green compact) Density ($Mg/m^3$) | Flux density (T) | Note Particle Size Distribution and Hardness of Iron Powder |
|---|---|---|---|
| B14 | 7.61 | 1.65 | Table 3 Conventional Example 3 |
| B15 | 7.62 | 1.67 | Table 3 Conventional Example 4 |

Table 7 shows that, using Iron Powders B1 to B10 according to the second embodiment, green compacts having higher density can be produced compared with the green compacts formed of Iron Powders B12 and B13 for Comparative Examples and B14 and B15 for Conventional Examples. Thus, the iron powder according to the second embodiment is suitable for magnetic parts requiring excellent magnetic characteristics.

Example 3-2

Application of Iron Powder According to Second Embodiment to Magnetic Sintered Part (Sintered Body)

Using iron powders shown in Table 3, magnetic sintered cores were produced as in EXAMPLE 1-2 and the density and magnetic flux of each magnetic sintered core were measured. The results are shown in Table 8.

TABLE 8

| Iron Powder | Magnetic Sintered Core (Sintered Body) Density ($Mg/m^3$) | Flux density (T) | Note Particle Size Distribution and Hardness of Iron Powder |
|---|---|---|---|
| B1 | 7.79 | 1.82 | Table 3 Example |
| B2 | 7.76 | 1.77 | Table 3 Example |
| B3 | 7.74 | 1.76 | Table 3 Example |
| B4 | 7.77 | 1.78 | Table 3 Example |
| B5 | 7.78 | 1.80 | Table 3 Example |
| B6 | 7.77 | 1.78 | Table 3 Example |
| B7 | 7.76 | 1,79 | Table 3 Example |
| B8 | 7.78 | 1.80 | Table 3 Example |
| B9 | 7.73 | 1.72 | Table 3 Example |
| B10 | 7.74 | 1,76 | Table 3 Example |
| B12 | 7.76 | 1,67 | Table 3 Comparative Example |
| B13 | 7.75 | 1.67 | Table 3 Comparative Example |
| B14 | 7.62 | 1.68 | Table 3 Conventional Example 3 |
| B15 | 7.63 | 1.69 | Table 3 Conventional Example 4 |

Table 8 shows that, using Iron Powders B1 to B10 according to the second embodiment, sintered parts having higher density can be produced compared with the sintered compacts formed of Iron Powders B12 and B13 for Comparative Examples and B14 and B15 for Conventional Examples. Thus, the iron powder according to the second embodiment is suitable for magnetic parts requiring excellent magnetic characteristics.

What is claimed is:

1. A highly compressible iron powder for powder metallurgy comprising, on the basis of mass percent of fractions after sieve classification using sieves defined in Japanese Industrial Standard (JIS) Z 8801-1:00 (Edition 2000):

substantially 0% particles that do not pass through a sieve having a nominal opening of 1 mm;

more than [0%] *25%* to about 45% or less particles that pass through a sieve having a nominal opening of 1 mm and do not pass through a sieve having a nominal opening of 250 μm;

about 30% and more to about 65% or less particles that pass through a sieve having a nominal opening of 250 μm and do not pass through a sieve having a nominal opening of 180 μm;

about 4% and more to about 20% or less particles that pass through a sieve having a nominal opening of 180 μm and do not pass through a sieve having a nominal opening of 150 μm; and 0% and more to about 10% or less particles that pass through a sieve having a nominal opening of 150 μm, wherein the Vickers microhardness of the particles that do not pass through the sieve having the nominal opening of 150 μm is at most about 110.

2. A highly compressible iron powder for powder metallurgy comprising, on the basis of mass percent of fractions after sieve classification using sieves defined in Japanese Industrial Standard (JIS) Z 8801-1:00 (Edition 2000):

substantially 0% particles that do not pass through a sieve having a nominal opening of 1 mm;

more than 0.0% to about 2% or less particles that pass through a sieve having a nominal opening of 1 mm and do not pass through a sieve having a nominal opening of 180 μm;

[about 30%] *44.7%* and more to [about 70%] *67.2%* or less particles that pass through a sieve having a nominal opening of 180 μm and do not pass through a sieve having a nominal opening of 150 μm; and

[about 20%] *31.3%* and more to [about 60%] *55.2%* or less particles that pass through a sieve having a nominal opening of 150 μm, wherein the Vickers microhardness of the particles that do not pass through the sieve having the nominal opening of 150 μm is at most about 110.

3. The highly compressible iron powder according to claim 1, wherein the impurity contents in the iron powder, on the basis of mass percent, are: C≤ about 0.1%, Si≤ about 0.1%, Mn≤ about 0.5%, P≤ about 0.02%, S≤ about 0.01%, O≤ about 1%, and N≤ about 0.01%.

4. The highly compressible iron powder according to claim 2, wherein the impurity contents in the iron powder, on the basis of mass percent, are: C≤ about 0.1%, S≤ about 0.1%, Mn ≤ about 0.5%, P≤ about 0.02%, S≤ about 0.01%, O≤ about 1%, and N≤ about 0.01%.

5. The highly compressible iron powder according to claim 3, wherein the impurity contents in the iron powder, on the basis of mass percent, are: C≤ about 0.005%, Si≤ about 0.01%, Mn≤ about 0.05%, P≤ about 0.01%, S≤ about 0.01%, O≤ about 0.10%, and N≤ about 0.003%.

6. The highly compressible iron powder according to claim 4, wherein the impurity contents in the iron powder, on the basis of mass percent, are: C≤ about 0.005%, S≤ about 0.01%, Mn≤ about 0.05%, P≤ about 0.01%, S≤ about 0.01%, O≤ about 0.10%, and N≤ about 0.003%.

7. The highly compressible iron powder according to claim 1, wherein the iron powder is formed by a water atomizing process.

8. The highly compressible iron powder according to claim 2, wherein the iron powder is formed by a water atomizing process.

* * * * *